(12) United States Patent
Scipio et al.

(10) Patent No.: US 9,644,542 B2
(45) Date of Patent: May 9, 2017

(54) TURBINE COOLING SYSTEM USING AN ENHANCED COMPRESSOR AIR FLOW

(71) Applicant: General Electric Company, Schenectady, NY (US)

(72) Inventors: Alston Ilford Scipio, Atlanta, GA (US); Julio Enrique Mestroni, Marietta, GA (US); Dale J. Davis, Greenville, SC (US); Sanji Ekanayake, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 411 days.

(21) Appl. No.: 14/274,874

(22) Filed: May 12, 2014

(65) Prior Publication Data

US 2015/0322865 A1    Nov. 12, 2015

(51) Int. Cl.
*F02C 9/18* (2006.01)
*F02C 3/13* (2006.01)
*F02C 7/12* (2006.01)

(52) U.S. Cl.
CPC ............ *F02C 9/18* (2013.01); *F02C 3/13* (2013.01); *F02C 7/12* (2013.01); *F05D 2270/061* (2013.01)

(58) Field of Classification Search
CPC .... F02C 3/13; F02C 7/12; F02C 7/185; F02C 9/18; F02C 9/28; F01D 17/02–17/08; F05D 2270/05; F05D 2270/053; F05D 2270/061; F05D 2270/071
See application file for complete search history.

(56) References Cited

U.S. PATENT DOCUMENTS

| | | | |
|---|---|---|---|
| 6,550,253 B2 * | 4/2003 | Mortzheim | F01D 17/105 60/782 |
| 8,015,826 B2 * | 9/2011 | Myers | F01K 13/02 60/782 |
| 8,240,153 B2 * | 8/2012 | Childers | F02C 6/08 60/782 |
| 8,261,528 B2 | 9/2012 | Chillar et al. | |
| 9,366,194 B2 * | 6/2016 | Feigl | F02C 9/18 |
| 2009/0056342 A1 * | 3/2009 | Kirzhner | F01D 25/12 60/772 |
| 2009/0235634 A1 | 9/2009 | Wang et al. | |
| 2009/0301078 A1 | 12/2009 | Chillar et al. | |
| 2012/0260668 A1 | 10/2012 | Rogers et al. | |
| 2013/0125557 A1 | 5/2013 | Scipio et al. | |
| 2013/0340439 A1 | 12/2013 | Ekanayake et al. | |
| 2014/0126991 A1 * | 5/2014 | Ekanayake | F02C 7/143 415/1 |

* cited by examiner

*Primary Examiner* — Arun Goyal
(74) *Attorney, Agent, or Firm* — Eversheds Sutherland (US) LLP

(57) ABSTRACT

The present application provides a gas turbine engine for low turndown operations. The gas turbine engine may include a compressor with a compressor bleed air flow, a turbine, and a compressor bleed air flow manifold. The compressor bleed air manifold directs a variable portion of the compressor bleed air flow to the turbine.

14 Claims, 3 Drawing Sheets

TURBINE COOLING SYSTEM USING AN ENHANCED COMPRESSOR AIR FLOW

TECHNICAL FIELD

The present application and the resultant patent relate generally to gas turbine engines and more particularly relate to a turbine cooling system using an enhanced compressor air flow for cooling the turbine and other components in extreme turndown operations.

BACKGROUND OF THE INVENTION

The demand on an electric grid may vary greatly on a day to day basis and even on an hour to hour basis. These variations may be particularly true in geographic regions with a significant percentage of renewables such as wind, solar, and other types of alternative energy sources. Overall gas turbine and power plant efficiency, however, generally requires gas turbine operation at base loads. Any reduction from base load may not only reduce efficiency but also may decrease component lifetimes and may increase undesirable emissions.

Nonetheless, there is a commercial need for spinning reserves to accommodate this variation in the load on the grid. Given such, there is a desire for traditional generating units to have "hibernation" capacity. That is, a generating unit is online but operating at an extremely low power output, i.e., extreme turndown loads. Such an operating mode is largely inefficient because valuable energy in the compressor air flow is discharged as bleed air and as such may be wasted. Moreover, compressor stall or surge may be a risk.

Current generating units may be limited to a hibernation mode of approximately forty-five percent (45%) or so of base load for an extended duration. Any further turndown may result in inadequately cooled turbine stage buckets as well as possibly exceeding component operating constraints, i.e., "a pinch point" in later turbine stages. Specifically, mechanical property limits, operational parameter limits, and emission limits may have an impact on the overall turndown percentage that may be reached safely.

There is thus a desire for improved gas turbine cooling systems so as to provide adequate cooling even during extreme turndown operations without the loss of overall efficiency, a decrease in component lifetime, or an increase in undesirable emissions. Moreover, the gas turbine engine should maintain the ability to ramp up quickly to base load when needed.

SUMMARY OF THE INVENTION

The present application and the resultant patent thus provide a gas turbine engine for low turndown operations. The gas turbine engine may include a compressor with a compressor bleed air flow, a turbine, and a compressor bleed air flow manifold. The compressor bleed air manifold directs a variable portion of the compressor bleed air flow to the turbine.

The present application and the resultant patent further provide a method of operating a gas turbine engine at low turndown. The method may include the steps of operating the gas turbine engine at a load of less than about thirty percent (30%) of base load, directing a compressor bleed air flow to a compressor bleed air flow manifold, providing a portion of the compressor bleed air flow to a turbine to cool one or more stages therein, and increasing the portion of the compressor bleed air flow to the turbine as the load decreases.

The present application and the resultant patent further provide a low turndown cooling system for use with a gas turbine engine. The low turndown cooling system may include a compressor bleed air flow from a compressor of the gas turbine engine and a compressor bleed air flow manifold to direct a portion of the compressor bleed air flow to a turbine of the gas turbine engine. The compressor bleed air manifold may include a number of differently sized flow tubes.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
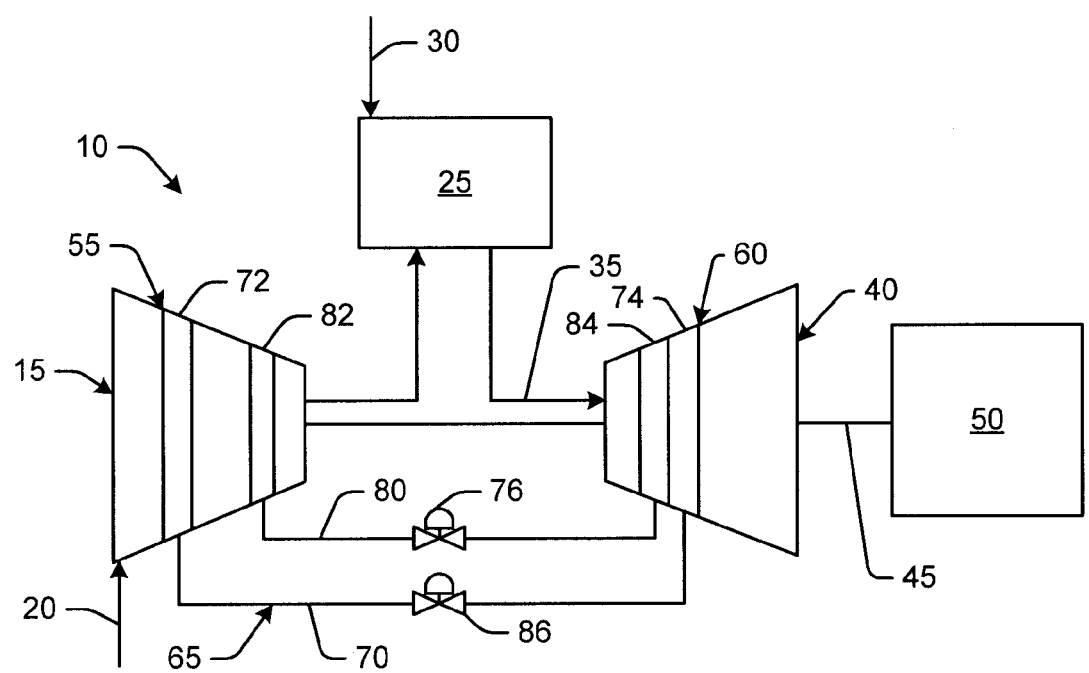
FIG. 1 is a schematic diagram of a gas turbine engine showing a compressor, a combustor, a turbine, and a load.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a combustor 25. The combustor 25 mixes the compressed flow of air 20 with a pressurized flow of fuel 30 and ignites the mixture to create a flow of combustion gases 35. Although only a single combustor 25 is shown, the gas turbine engine 10 may include any number of combustors 25 positioned in a circumferential array or otherwise. The flow of combustion gases 35 is in turn delivered to a turbine 40. The flow of combustion gases 35 drives the turbine 40 so as to produce mechanical work. The mechanical work produced in the turbine 40 drives the compressor 15 via a shaft 45 and an external load 50 such as an electrical generator and the like.

The gas turbine engine 10 may use natural gas, liquid fuels, various types of syngas, and/or other types of fuels and combinations thereof The gas turbine engine 10 may be any one of a number of different gas turbine engines offered by General Electric Company of Schenectady, N.Y., including, but not limited to, those such as a Frame 6, 7, or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 may be part of a combined cycle system (not shown). Generally described in a typical combined cycle system, the flow of hot exhaust gases from the turbine 40 may be in communication with a heat recovery steam generator or other type of heat exchange device. The heat recovery steam generator, in turn, may be in communication with a multi-stage steam turbine and the like so as to drive a load. The load may be same load 50 driven by the gas turbine engine 10 or a further load or other type of device. Other components and other configurations also may be used herein.

The compressor 15 may include a number of compressor stages 55 therein. Likewise, the turbine 40 also may have any number of turbine stages 60 therein. The gas turbine engine 10 thus may use a number of air extractions 65 to provide cooling air from the compressor 15 to the turbine 40. In this example, a ninth stage extraction line 70 may extend from a ninth stage 72 of the compressor 15 to a third stage 74 of the turbine 40. A ninth stage extraction control valve 86 may be positioned thereon. Likewise, the gas turbine engine 10 may have a thirteenth stage extraction line 80 extending from a thirteenth stage 82 of the compressor 15 to a second stage 84 of the turbine 40. A thirteenth stage extraction control valve 76 may be positioned thereon. Other types of air extractions may be used herein in any configuration.

Figure 2:
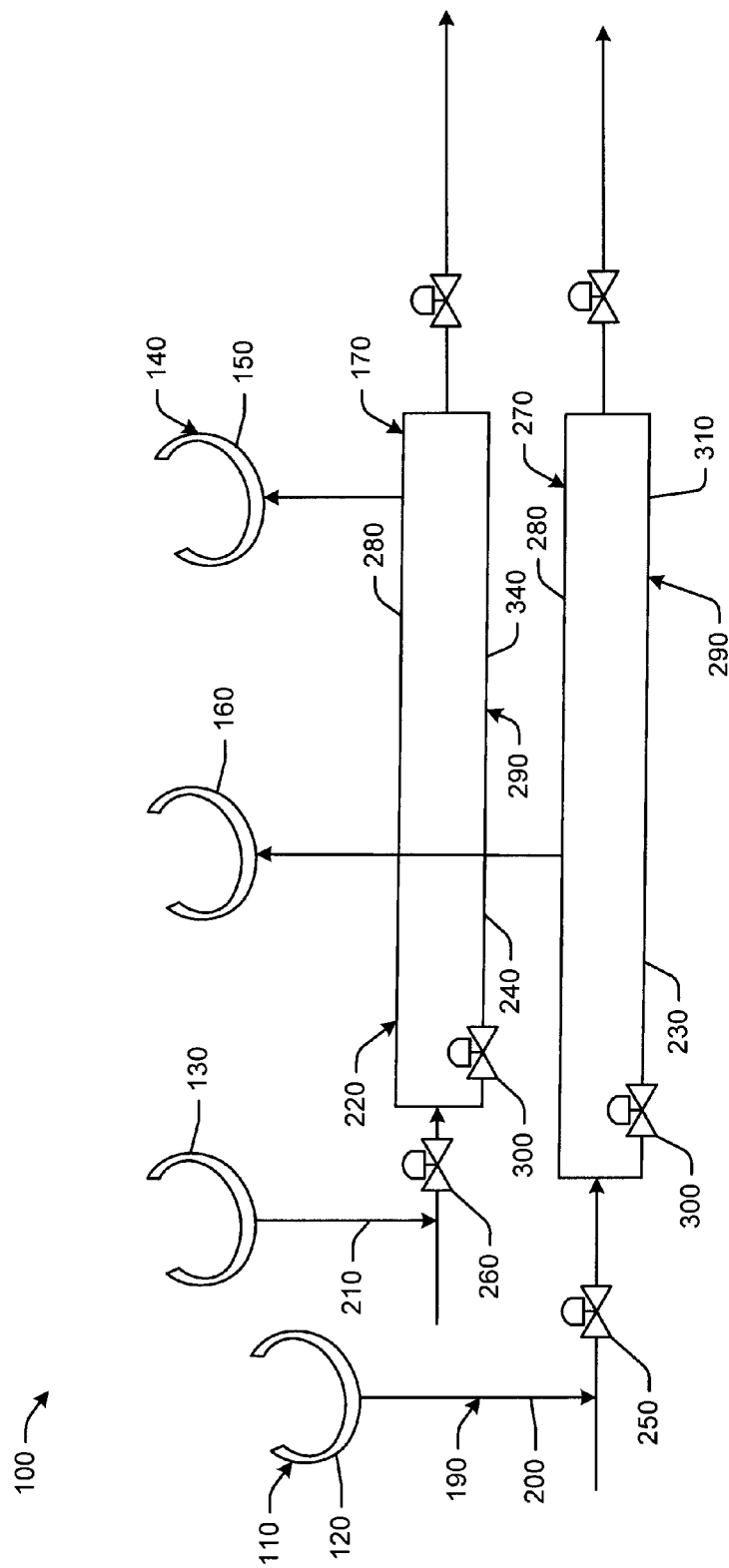
FIG. 2 is a schematic diagram of a portion of a gas turbine engine with a turndown cooling system as may be described herein.

FIG. 2 shows a portion of a gas turbine engine 100 as may be described herein. The gas turbine engine 100 may include a compressor 110. In this example, a ninth stage 120 and a thirteenth stage 130 of the compressor 110 are shown. Any number of stages may be used herein. The gas turbine engine 100 also includes a turbine 140. In this example, a second stage 150 and a third stage 160 of the turbine 140 are shown. Any number of stages may be used herein. Other components and other configurations may be used herein.

The gas turbine engine 100 also may include a turndown cooling system 170. The turndown cooling system 170 may include one or more sources of compressor bleed air with one or more flows of compressor bleed air 190. The compressor bleed air flow 190 may be compressor discharge air, compressor discharge casing extraction air, and the like. In this example, a ninth stage compressor bleed air extraction 200 and a thirteenth stage compressor bleed air extraction 210 are shown. Other types of extractions and other sources of compressor bleed air 190 may be used herein. The ninth stage bleed air extraction 200 may be in communication with the third stage 160 of the turbine 140 or other later stages. The thirteenth stage compressor bleed air extraction 210 may be in communication with the second stage 150 of the turbine 140 or elsewhere. The compressor bleed air extraction 200, 210 may cool the stages of the turbine 140 and the components thereof.

The compressor bleed air extractions 200, 210 may have appropriate dampers, blowers, and the like as well as internal baffles to minimize back pressure so as to achieve overall gas temperature uniformity. A number of control valves, control sensors, temperature sensors, and other types of controls and sensors may be used herein. Overall operations of the turndown cooling system 170 may be controlled by the overall gas turbine control (e.g., a "GE Speedtronic" controller or a similar device) or a dedicated controller per the optimization logic. ("Speedtronic is a trademark of the General Electric Company of Schenectady, N.Y.) Other components and other configurations may be used herein.

The turndown cooling system 170 may include one or more compressor bleed air extraction manifolds 220. In this example, a ninth stage manifold 230 and a thirteenth stage manifold 240 are shown. Any number of the compressor bleed air extractions manifolds 220 may be used herein. The ninth stage compressor bleed air extraction 200 may be in communication with the ninth stage manifold 230 via a ninth stage compressor bleed air extraction isolation valve 250. The thirteenth stage compressor bleed air extraction 210 may be in communication with the thirteenth stage manifold 240 via a thirteenth stage compressor bleed air extraction isolation valve 260. The isolation valves 250, 260 may be of conventional design. Other types of valves and controls may be used herein. Other components and other configurations may be used herein.

Each manifold 220 may have a number of differently sized flow tubes 270 therein. Traditionally, compressor bleed air extractions were limited to about five percent (5%) of the total compressor flow. One of the flow tubes 270 in each manifold 220 thus may be a five percent (5%) flow tube 280. Specifically, the five percent flow tube 280 may be used to provide up to about five percent of the compressor flow to the turbine 140. Each of the compressor bleed air extraction manifolds 220 also may have one or more enhanced flow tubes 290. The enhanced flow tubes 290 may have an enhanced flow tube valve 300 thereon. In this example, the enhanced flow tube 290 may be a thirty percent (30%) flow tube 310. The thirty percent flow tube 310 thus may accommodate about six percent (6%) to about thirty percent (30%) of the flow. The enhanced flow tubes 290 may accommodate any percentage of the total compressor flow. Any number of the flow tubes 270 may be used herein in any suitable size, shape, configuration, or capacity with the logic controls for fidelity tuning of the compressor flow within about five percent (5%) to about sixty percent (60%) or so.

In combination, the turndown cooling system 170 thus may accommodate from about zero (0) to about sixty percent (60%) of the overall compressor air flow capability. The five percent flow tube 280 also may be used for start-up and for other purposes. The enhanced flow tube 290 may be used to achieve higher compressor flows. The five percent flow tube 280 also may be used to provide fidelity tuning when in turndown operation. Other components and other configurations also may be used herein.

The turndown cooling system 170 thus may provide the compressor bleed air flow 190 so as to optimize later stage cooling in the turbine 140. The turndown cooling system 170 may have little to no impact on the compressor inlet or the turbine exhaust such that the gas turbine engine 100 operating in the largely hibernation mode may maintain the desired fuel-air ratio so as to limit overall emissions within existing standards. The gas turbine engine 100 may operate with exhaust gas temperatures within the inlet temperature limits of the heat recovery steam generator during any operating mode so as to improve overall combine cycle capacity and steam producing capability. Moreover, the turndown cooling system 170 also may provide the gas turbine engine 100 with the ability for fast ramp up to base load. The gas turbine engine 100 thus may reach hibernation mode of less than about thirty percent (30%) of base load, possibly within about twenty to twenty-five percent (20-25%) load range, or possibly as low as about ten percent (10%) or so. Other percentages and other loads may be used herein.

The turndown cooling system 170 thus delivers a previously unavailable operating range for the gas turbine engine 100. The turndown cooling system 170 may require minimal additional components with no design changes to the overall gas turbine engine 100. The turndown cooling system 170 may optimize later stage bucket temperatures via the enhanced compressor bleed air flow 190. Such cooling may prevent the turbine 140 from exceeding overall temperature limitations so as to improve component lifetime. The turndown cooling system 170 may increase overall power plant reliability in that forced outages due to exceeding operational parameters and/or emissions limits may be reduced.

Moreover, improved overall performance may be provided by reducing the propensity for turndown limitations with improved part load heat rate. The overall gas turbine engine 100 further may increase the total hours of operation. The turndown cooling system 170 may be original equipment or part of a retrofit.

Figure 3:
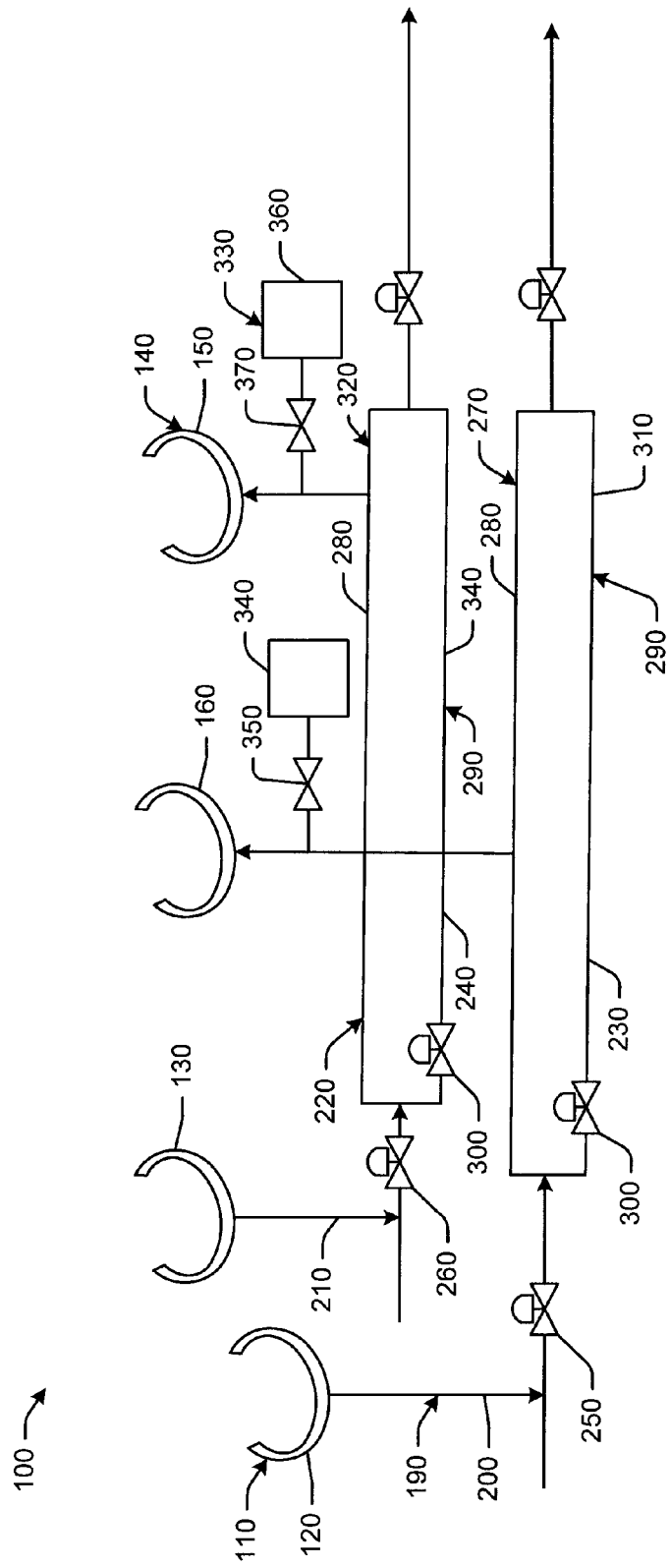
FIG. 3 is a schematic diagram of an alternative embodiment of a turndown cooling system as may be described herein.

FIG. 3 shows a further embodiment of turndown cooling system 320 as may be described herein. The turndown cooling system 320 may be largely similar to that described above, but with a number of auxiliary uses 330. In this example, a ninth stage auxiliary use 340 with a ninth stage auxiliary use valve 350 thereon may be used. Likewise, a thirteenth stage auxiliary use 360 with a thirteenth stage auxiliary use valve 370 thereon may be used. Other types of auxiliary uses 330 may be provided herein with any percentage of the overall compressor flow.

The auxiliary uses 330 thus may allow the turndown cooling system 320 to avoid wasting the valuable compressor bleed air 190. Specifically, the auxiliary uses 330 may allow the compressor bleed air 190 to be used in pump storage applications for later utilization in driving a power turbine, for mixing homogenously in a chamber with steam or demineralized water that may be injected to achieve a required/predetermined motive fluid temperature for power plant system or component cooling, heated by or blended with the turbine exhaust stream and bled into the inlet as part of the inlet bleed heat system, and for other uses. Other components and other configuration may be used herein.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A gas turbine engine for low turndown operations, comprising:
    a compressor;
    the compressor comprising an air bleed port to extract a compressor bleed air flow;
    a turbine; and
    a compressor bleed air flow manifold in fluid communication with the air bleed port;
    wherein the compressor bleed air manifold comprises a plurality of flow tubes in parallel, and wherein each of the plurality of flow tubes are differently sized having a different flow capacity such that each of the plurality of flow tubes directs a different percentage of the compressor bleed air flow to the turbine.

2. The gas turbine engine of claim 1, wherein the compressor bleed air flow comprises a ninth stage compressor bleed air flow extraction to cool a third stage of the turbine.

3. The gas turbine engine of claim 1, wherein the compressor bleed air flow comprises a thirteen stage compressor bleed air flow extraction to cool a second stage of the turbine.

4. The gas turbine engine of claim 1, further comprising a plurality of compressor bleed air flow manifolds.

5. The gas turbine engine of claim 1, wherein the compressor bleed air flow manifold comprises a ninth stage manifold.

6. The gas turbine engine of claim 1, wherein the compressor bleed air flow manifold comprises a thirteenth stage manifold.

7. The gas turbine engine of claim 1, wherein the plurality of flow tubes comprise a five percent of total compressor flow tube.

8. The gas turbine engine of claim 1, wherein the plurality of flow tubes comprise an enhanced flow tube.

9. The gas turbine engine of claim 1, wherein the plurality of flow tubes comprise a thirty percent of total compressor flow tube.

10. The gas turbine engine of claim 1, wherein the compressor bleed air manifold comprises an enhanced flow tube valve.

11. The gas turbine engine of claim 1, wherein the compressor bleed air flow manifold is in communication with one or more auxiliary uses.

12. The gas turbine engine of claim 1, wherein the different percentage of the compressor bleed air flow directed to the turbine by the compressor bleed air manifold is up to about sixty percent (60%) of total compressor flow.

13. The gas turbine engine of claim 1, wherein a low turndown operations comprise less than about thirty percent (30%) of base load.

14. A method of operating a gas turbine engine at low turndown, comprising:
    operating the gas turbine engine at a load of less than about thirty percent (30%) of base load;
    directing a compressor bleed air flow from an air bleed port in a compressor to a compressor bleed air flow manifold in fluid communication with the air bleed port, wherein the compressor bleed air manifold comprises a plurality of flow tubes in parallel, wherein each of the plurality of flow tubes are differently sized having a different flow capacity such that each of the plurality of flow tubes directs a different percentage of the compressor bleed air flow to the turbine;
    providing a portion of the compressor bleed air flow to a turbine to cool one or more stages therein; and
    increasing the portion of the compressor bleed air flow to the turbine as the load decreases.

* * * * *